United States Patent
Dabbicco et al.

(10) Patent No.: US 8,234,081 B2
(45) Date of Patent: Jul. 31, 2012

(54) SYSTEM FOR OPTICAL FIBER STRAIN MEASURE

(75) Inventors: Maurizio Dabbicco, Bari (IT); Gaetano Scamarcio, Bari (IT); Simona Ottonelli, Ruvo di Puglia (IT); Angela Intermite, Grottaglie (IT); Branimir Radisavljevic, Rudnica (YU)

(73) Assignee: Universita degli Studi di Bari, Bari (IT)

( * ) Notice: Subject to any disclaimer, the term of this patent is extended or adjusted under 35 U.S.C. 154(b) by 396 days.

(21) Appl. No.: 12/563,920

(22) Filed: Sep. 21, 2009

(65) Prior Publication Data
US 2010/0076700 A1    Mar. 25, 2010

(30) Foreign Application Priority Data
Sep. 22, 2008   (EP) .................... 08425618

(51) Int. Cl.
  *G01L 1/24*   (2006.01)
  *G06F 17/00*   (2006.01)
(52) U.S. Cl. ............. 702/42; 702/40; 702/127; 356/32; 356/73.1; 356/614
(58) Field of Classification Search ............. 702/42, 702/40, 127, 159
See application file for complete search history.

(56) References Cited

U.S. PATENT DOCUMENTS

| | | | | |
|---|---|---|---|---|
| 5,798,521 A | * | 8/1998 | Froggatt | 250/227.19 |
| 5,821,426 A | * | 10/1998 | Uchiyama | 73/800 |
| 5,889,901 A | * | 3/1999 | Anderson et al. | 385/12 |
| 5,986,749 A | * | 11/1999 | Wu et al. | 356/73.1 |
| 2008/0085073 A1 | | 4/2008 | Jones | |

FOREIGN PATENT DOCUMENTS

| | | |
|---|---|---|
| EP | 0 404 242 A1 | 12/1990 |
| EP | 1 760 424 A1 | 3/2007 |
| GB | 2 276 449 A | 9/1994 |

OTHER PUBLICATIONS

Suleiman et al., "Remote fiber Bragg grating strain sensing by self-mixing interferometry," 3rd International Conference on Information and Communication Technologies: From Theory to Applications, Apr. 7-11, 2008, pp. 1-6.

* cited by examiner

*Primary Examiner* — Hal Wachsman
(74) *Attorney, Agent, or Firm* — Seed IP Law Group PLLC

(57) ABSTRACT

A system measures the strain of an object. The system includes a laser source for generating an output radiation, a strainable optical fiber having first and second facets, and means for calculating a measure of a strain of the optical fiber. The first facet is coupled to the laser source to receive the output radiation and transmit a guided radiation over the optical fiber towards the second facet. The second facet is adapted to receive the guided radiation and to reflect a corresponding reflected radiation towards the first facet. The laser source is a self-mixing type adapted to receive at least part of the reflected radiation and to mix the output radiation with the received radiation. The calculating means calculate the measure of the strain of the optical fiber based on a self-mixing effect in the laser source that is caused by the linear displacement of the second section.

20 Claims, 3 Drawing Sheets

SYSTEM FOR OPTICAL FIBER STRAIN MEASURE

BACKGROUND

1. Technical Field

The present disclosure relates to a system for the measure of the strain of an object. Still more in particular, the disclosure concerns a strain measurement system based on the strain of an optical fiber.

2. Description of the Related Art

It is known that the measure of the strain of an object can be performed by a system including a laser source and an optical fiber: this measurement system is commonly indicated as strain measurement system (or strain sensor) based on the optical fiber (or shortly as "fiber based strain system").

A known fiber based strain system (see for example the US application having publication number 2008/0085073) performs the measure of the object strain using an optical fiber including a fiber Bragg grating in a short segment (few centimeters long) of the optical fiber which is attached to the strainable object and it's strained thereof. According to the known system, the laser source generates an output radiation, which is guided over the optical fiber and it's reflected by the fiber Bragg grating, wherein the reflected radiation is affected by a wavelength shift which depends on the strain of the segment of the optical fiber including the fiber Bragg grating. A receiver converts the reflected radiation into electrical signals and a spectrum analyzer estimates the strain of the segment of the optical fiber (including the fiber Bragg grating) from the variation of the amplitude of the reflected radiation. This known system has the disadvantages that the resolution of the strain measure depends on the stop-band of the fiber Bragg grating, that complex electronic devices are required for performing the measure and that it's possible to perform the measure of only a short segment of the strainable object (for example, a structural joint) because the fiber Bragg grating is few centimeters long.

Another known fiber based strain system (see for example the European application having publication number EP1760424) performs the measure of the object strain using the Brillouin scattering phenomenon, by determining the Brillouin loss or gain spectrum from the light emerging from the optical fiber. This known system has the disadvantages to require an expensive optical fiber (Erbium doped), to require an high power laser source and to require complex electronic devices for performing the measure.

BRIEF SUMMARY

One embodiment is an improved fiber based strain system. The system performs a strain measurement using the optical fiber itself as the sensing element and using the self-mixing effect in the laser source for the measure of the strain of the optical fiber.

Advantages of the disclosure are:
  to allow the measure of the strain of a longer object;
  to decrease the complexity and the cost of the measurement system, especially of the electronic devices performing the measure, keeping at the same time a good resolution and working frequency range.

DISCLOSURE DETAILED DESCRIPTION

Figure 1:
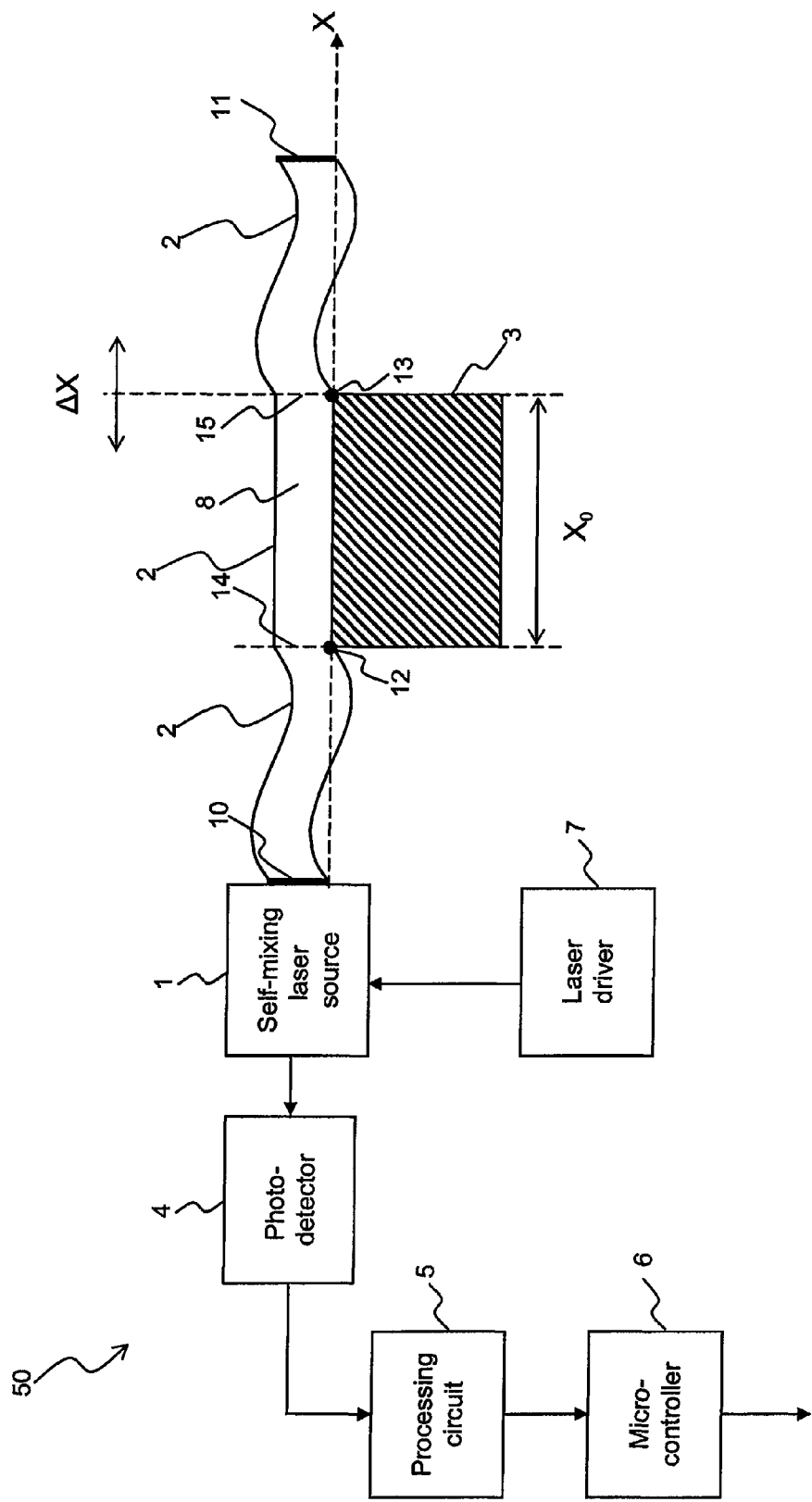
FIG. 1 schematically shows a fiber based strain system according to an embodiment of the disclosure.

Referring to FIG. 1, it shows a measurement system 50 based on the strain of an optical fiber according to an embodiment of the disclosure. The measurement system includes a self-mixing laser source 1, an optical fiber 2, an object 3, a photo-detector 4, a processing circuit 5, a micro-controller 6 and a laser driver 7.

Preferably, the laser source 1 is a Distributed Feed Back (DFB) InGaAsP laser diode adapted to generate an output radiation having for example a wavelength of 1550 nm. Advantageously, the laser source 1 is pigtailed, that is the laser source 1 is coupled to the optical fiber 2 in advance (for example, during manufacturing of the laser source) in order to have a single package including both the laser source 1 and the first facet 10 of the optical fiber 2 (for example, the package is made of plastic), wherein the position of the laser source 2 respect to the position of the first facet 10 is such that the coupling efficiency (for example, the alignment between the laser source and the optical fiber) is maximized and the radiation reflected by the first facet 10 towards the laser source 1 is minimized. Moreover, the laser source 1 is a self-mixing type which is adapted to generate an output radiation and to receive a reflected radiation: the output radiation is mixed with the received radiation and this mix causes a variation of an optical property (for example, the optical power) of the output radiation, like it will be explained better afterwards.

The optical fiber 2 is for example a single-mode optical fiber (like a Corning SMF28), which is defined between a first facet 10 coupled to the laser source 1 and a second facet 11. Preferably, the second facet 11 is free-standing; for example, the second facet is terminated with an optical fiber connector, like a FP/PC connector. The optical fiber 2 is at least in part strainable: specifically, the optical fiber 2 includes a part 8 defined between a first section 14 of the optical fiber 2 and a second section 15 of the optical fiber 2 (the part 8 can also be indicated as a "segment" of the optical fiber 2) and the initial length $X_0$ of the part 8 of the optical fiber 2 can change, by increasing or decreasing the length, like it will be explained more in detail afterwards. For example, the length of the part 8 of the optical fiber 2 is comprised between few centimeters and some meters and this length can increase up to some millimeters and can decrease up to some millimeters. Therefore the second section 15 is movable by the strain of the part 8 of the optical fiber 2 according to a linear displacement of the second section 15 respect to the first section 14: this is achieved by stretching the part 8 of the optical fiber 2.

The object 3 is strainable: specifically, in order to explain the disclosure it is supposed that the object 3 becomes deformed in a direction X which is substantially parallel to the part 8 of the optical fiber 2 and thus the length of the object 3 changes (by increasing or decreasing the length) in the direction X. For example, the object 3 is an axle which can become deformed in the direction X in case of a variation of the temperature, a mechanical stress or vibrations; the axle can be the truss of a bridge or a part of an industrial machine (a milling machine, a lathe, . . . ). The object 3 can be a part of a larger object.

The part 8 of the optical fiber 2 is attached to the surface of the object 3 such that a strain of at least part of the object 3 causes a strain of the part 8 of the optical fiber 2; it is supposed that the part 8 is subject to a strain which is equal to the strain of the object 3, that is the initial length of the object 3 along the direction X is equal to $X_0$ (previously referred as the initial length of the part 8) and can change by $\Delta X$ (previously referred as the linear displacement of the second section 15 respect to the first section 14 of the part 8). Specifically, FIG. 1 shows that the first section 14 of the part 8 of the optical fiber 2 is attached to the object 3 into point 12 placed on the direction X and shows that the second section 15 is attached to the object 3 into point 13 placed on the direction X, so that the second section 15 is movable by the strain of the object 3 according to a linear displacement $\Delta X$ of the second section 15 respect to the first section 14 along the direction X of the part 8 (in other words, the length of the part 8 of the optical fiber 2 can change). The disclosure allows to measure a linear displacement $\Delta X$ up to some millimeters with a single mode fiber, such as a Corning SMF28 fiber. The dynamic range (that is, the maximum linear displacement $\Delta X$ which can be measured by the system 50) is limited only by the yield strength of the part 8 of the specific optical fiber 2 along the direction X. Specifically, the yield strength of a Corning SMF28 optical fiber 2 is about $10*10^{-3}*X_0$, wherein $X_0$ is the initial length of the part 8 of the optical fiber 2 (that is, before the part 8 becomes deformed): therefore the dynamic range of the system 50 is about $10*10^{-3}*X_0$ and the length of the part 8 of the optical fiber 2 can increase (or decrease) up to $10*10^{-3}*X_0$. For example, the dynamic range of the system 50 is 10 millimeters for $X_0$ equal to one meter.

The part 8 of the optical fiber 2 can be attached to the object 3 according to different solutions: for example, the part 8 can be glued to (part or all) the surface of the object 3 or can be embedded into the object 3 (e.g. it can be attached into a hollow portion of the object 3).

The photo-detector 4 (for example, a photo-diode) is adapted to generate an electrical signal from the detected optical power of the output radiation generated by the laser source 1.

The processing circuit 5 is adapted to process the electrical signal.

The micro-controller 6 is adapted to provide the measure of the strain of the object 3.

The means including the photo-detector 4, the processing circuit 5 and the micro-controller 6 have the functionality to calculate a measure of the strain of the object 3 from the variation of the optical property of the output radiation generated by the laser source 1, like it will be explained more in detail afterwards.

The laser driver 5 is adapted to drive the laser source 1.

It will be described hereinafter the functionality of the embodiment of the measurement system 50, with reference to FIG. 1.

The laser source 1 generates an output radiation, which is received (at least in part) by the optical fiber 2 through the first facet 10. The output radiation is guided over the optical fiber 2 towards the second facet 11.

The second facet 11 receives the guided radiation and reflects therefrom a reflected radiation towards the first facet 10.

The laser source 1 receives (at least part of) the reflected radiation guided from the second facet 11 to the first facet 10 and the received radiation enters the cavity of the laser source 1 generating a self-mixing effect. According to the self-mixing effect, an interference between the output radiation generated in the laser cavity (and transmitted over the optical fiber 2) and the reflected radiation which enters the laser cavity occurs in the cavity of the laser source 1. In case of a variation of the optical path-length between the output facet of the laser source 1 and the second facet 11 of the optical fiber, this interference causes a modulation of the amplitude or frequency of the oscillating field in the laser cavity and thus a variation of the optical properties of the output radiation generated by the laser source 1, like a variation of the optical power, of the frequency, of the laser line-width or of the junction voltage. The variation of the optical path-length between the output facet of the laser source 1 and the second facet 11 of the optical fiber is achieved through the linear displacement $\Delta X$ of the second section 15 of the optical fiber 2 respect to the first section 14 along the part 8 of the optical fiber 2, because the part 8 of the optical fiber 2 is stretched and a strain of the part 8 of the optical fiber 2 causes the linear displacement $\Delta X$ of the second section 15; therefore this variation depends on the linear displacement $\Delta X$ of the second section 15 (in other words, depends on the length of the part 8 of the optical fiber 2, which changes by $\Delta X$) and thus the variation of a property of the laser source 1 (for example, of the optical power) provides an estimation of the measure of the strain of the part 8 of the optical fiber 2, thus providing an estimation of the measure of the strain of the object 3.

More in general, the variation of the optical power depends on the motion of the second section 15 (another example is the speed of the second section 15).

In order to explain the disclosure, it will be considered only the variation of the optical power of the output radiation generated by the laser source 1.

Depending on the intensity of the optical power of the radiation which enters the laser cavity, a different interference can occur; specifically, the measure of the strain is performed in condition of a moderated feedback, which is defined by a feedback parameter comprised between 1 and 4.6.

The photo-detector 4 detects the variation of the optical power of at least part of the modified output radiation generated by the laser source 1 and generates therefrom an electrical signal (for example, a current) having fluctuations depending on the linear displacement $\Delta X$ of the second section 15 respect to the first section 14. In case of moderated feedback, a sawtooth current signal generated by the photo-detector 4 has an amplitude modulation and the number of peaks of the sawtooth current signal provides a measure of the linear displacement $\Delta X$ of the second section 15 with a resolution (that is, the minimum linear displacement $\Delta X$ which can be measured) of about 0.8 µm; moreover, the condition of moderated feedback allows the measure of the direction of the linear displacement $\Delta X$ of the second section 15 (that is, if the second section 15 is moving towards the laser source 1 or if it's moving away) through the slope of the interference fringes.

Finally, the electrical signal generated by the photo-detector is processed electronically and a measure of the linear displacement $\Delta X$ of the second section 15 (thus of the strain of the part 8 of the optical fiber 2 and of the strain of the object 3) is provided, taking into account the number of peaks of the sawtooth current signal generated by the photo-detector 4 (from the detected optical power of the output signal generated by the laser source 1).

FIG. 1 shows that a part 8 of the optical fiber 2 is attached to the object 3, but the disclosure can be performed also according to the following other embodiments:

the entire optical fiber 2 is attached to the object 3 (like shown in FIGS. 2 and 3): in this case, the part 8 is the entire optical fiber 2, the first section 14 of the optical fiber 2 is the first facet 10 of the optical fiber 2, the second section 15 of the optical fiber 2 is the second facet 11 of the optical fiber 2 and the entire optical fiber 2 is stretched;

a part of the optical fiber 2 is attached to the object 3 and this part is defined between the first facet 10 and the second section 15, while the second facet 11 is not attached to the object 3 (for example, it's free-standing): in this case the optical fiber 2 is stretched between the first facet 10 and the second section 15;

a part of the optical fiber 2 is attached to the object 3 and this part is defined between the first section 12 and the second facet 11, while the first facet 10 is not attached to the object 3: in this case the optical fiber 2 is stretched between the first section 14 and the second facet 11.

FIG. 1 shows a linear displacement $\Delta X$ of the second section 15 respect to the first section 14 along the part 8 of the optical fiber 2, wherein the direction X is substantially parallel to the part 8 of the optical fiber 2, because it is supposed that the object 3 becomes deformed along the direction X. Anyway, the object 3 can become deformed along any other direction in the plane defined by the top surface substantially flat of the object 3 and thus the linear displacement of the second section 15 (respect to the first section 14) along the part 8 of the optical fiber 2 can occur along any direction in the plane defined by the top surface of object 3. For example, the plane defined by the top surface of the object 3 is defined by the axis X (parallel to the initial position of the part 8 having initial length $X_0$, that is $X_0$ is the length of the part 8 before it becomes deformed) and by an axis Y (perpendicular to the axis X): the object 3 can become deformed by a linear displacement $\Delta Y$ only in the direction Y and, in this case, the second section 15 is subject to a linear displacement $\Delta R$ (respect to the first section 14) along a direction R parallel to the deformed part 8 of the optical fiber 2 (in other words, if $X_0$ and $\Delta Y$ are vectors, R is the vector addition of $X_0$ and $\Delta Y$).

Figure 2:
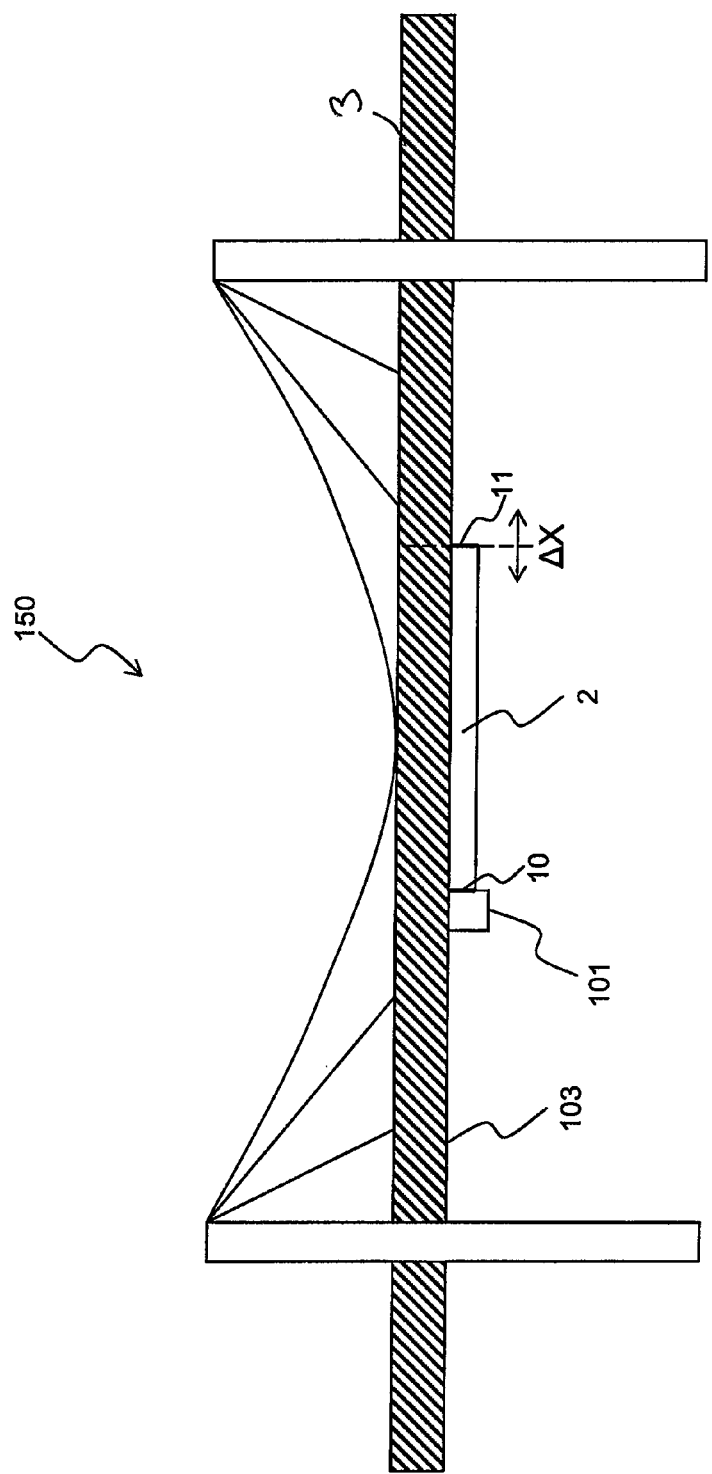
FIG. 2 schematically shows a first example wherein the fiber based strain system according to the disclosure can be used.
Figure 3:
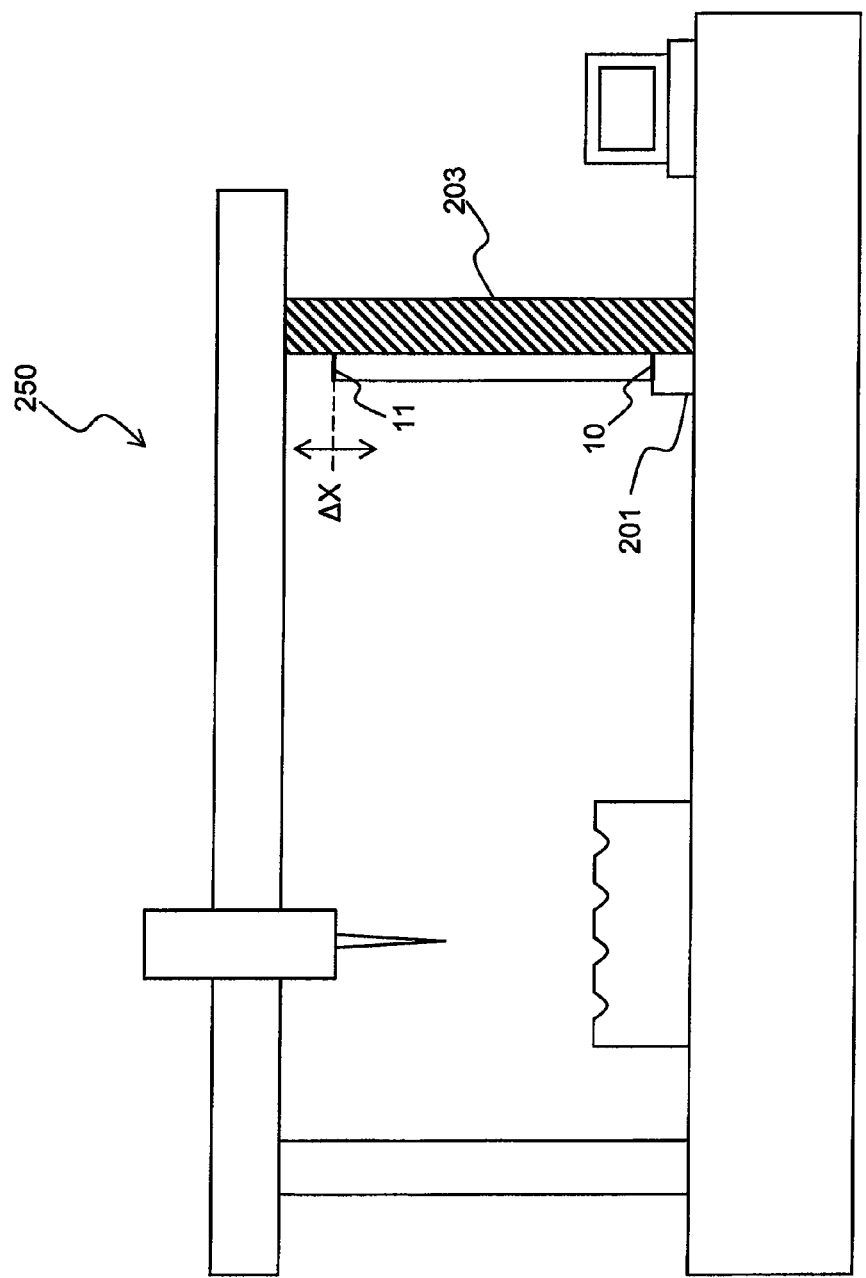
FIG. 3 schematically shows a second example wherein the fiber based strain system according to the disclosure can be used.

FIGS. 2 and 3 show a first and a second example wherein the disclosure can be used. The strainable object 3 is an axle which can become deformed in case of a variation of the temperature or in case of structural problems; the axle can be part of the truss 103 of a bridge 150 like shown in FIG. 2 or can be a part 203 of an industrial machine 250 (a milling machine, a lathe, . . . ) like shown in FIG. 3. The device 101 shown in FIGS. 2 and 3 includes the self-mixing laser source 1, the photo-detector 4 and the laser driver 7; preferably, the device 101 is a single package made of metal. Advantageously, the package 101 is pigtailed, that is the package 101 is coupled to the optical fiber 2 in advance, such that the coupling efficiency is maximized. The optical fiber 2 is attached to the part of the truss 103 or to the part 203 and the device 101 is mounted on the truss 103 or on the part 203 and it's coupled to the first facet 10. Therefore the first section 14 is the first facet 10 and the second section 15 is the second facet 11, which is moved by the strain of the optical fiber 2 (which is caused by the strain of the part of the axle 103 or by the part 203) according to a linear displacement $\Delta X$ of the second facet 11 respect to the first facet 10; this linear displacement $\Delta X$ is measured by the system according to the disclosure.

Preferably, the reflected radiation is comprised between 0.01% and 0.1% of the guided radiation; this allows to control the optical power of the reflected radiation which enters the cavity of the laser source 1, in order to achieve the moderated self-mixing effect, that is a moderated mix of the output radiation generated by the self-mixing laser source 1 with the radiation received by the self-mixing laser source 1.

Preferably, the second facet 11 of the optical fiber 2 is covered at least in part by a refraction index matching gel: this allows to control the optical power of the reflected radiation which enters the cavity of the laser source 1, in order to achieve the moderated self-mixing effect, that is a moderated mix of the output radiation generated by the self-mixing laser source 1 with the radiation received by the self-mixing laser source 1.

Preferably, the second facet 11 of the optical fiber 2 is cleaved at an angle comprised between 7 and 9 degrees, preferably equal to about 8 degrees: this allows to further control the optical power of the reflected radiation in order to achieve the moderated self-mixing effect. Advantageously, the second facet 11 is cleaved and it's also terminated with an optical fiber connector, like a FP/PC connector.

Preferably, the second facet 11 of the optical fiber 2 is covered at least in part by a refraction index matching gel and it's also cleaved at an angle comprised between 7 and 9 degrees (preferably equal to about 8 degrees), in order to provide more flexibility for achieving the moderated self-mixing effect.

Alternatively, the moderated self-mixing effect is achieved by a second facet 11 (of the optical fiber 2) which is obtained by roughly cutting the optical fiber 2; advantageously, the second facet 11 is also terminated with an optical fiber connector, like a FP/PC connector.

Preferably, the optical fiber is bended in a multi-fold optical path in order to extend the fiber length and at the same time to keep limited the footprint of the measurement system. For example, the fiber can be U-folded two-times, so that the fiber length is doubled; the fiber can be U-folded more than two times, thus further increasing the fiber length. This has the advantage to increase the resolution of the measurement system 50 (that is, to increase the minimum linear displacement $\Delta X$ which can be measured and thus to increase the minimum strain of the object 3 which can be measured, because it's supposed that the linear displacement $\Delta X$ of the second section 15 is equal to strain of the object 3), because the resolution is proportional to the inverse of the length of the part 8. Specifically, the measurement system 50 with an unbended optical fiber provides a resolution of about 0.8 µm, while the system with a two-times U-folded bended optical fiber provides a resolution of about 0.4 µm.

The measurement system according to the disclosure allows to achieve a working frequency range comprised between 1 Hz and 150 Hhz, that is it's possible to measure a variation of the length of the optical fiber having a frequency comprised between 1 Hz and 150 Hz.

According to another aspect of the disclosure, a plurality of optical fibers are attached (at least in part) to the object 3 over different directions in the plane defined by the top surface substantially flat of the object 3 or is embedded in the object 3. The plurality of optical fibers have each one a first facet coupled to a corresponding plurality of self-mixing laser sources and have a second section which is movable according to a linear displacement respect to the corresponding first section along the corresponding optical fiber. This system allows to measure at the same time the strain of the object 3 over different directions, wherein the strain can be either a linear displacement or an angular displacement.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed as broadly as allowed by legal precedent along with the full scope of equivalents to which such claims are entitled.

The invention claimed is:

1. A measurement system, comprising:
a laser source configured to generate an output radiation;
a strainable optical fiber having a first and a second facet, wherein the first facet is coupled to the laser source for receiving at least part of the output radiation and for transmitting therefrom a guided radiation over the optical fiber towards the second facet;
means for calculating a measure of a strain of at least part of the optical fiber, wherein:
the at least part of the optical fiber includes a first section and a second section, wherein the second section is movable by the strain of the at least part of the optical fiber according to a linear displacement of the second section with respect to the first section along the at least part of the optical fiber;
the second facet is configured to receive the guided radiation and to reflect therefrom a corresponding reflected radiation towards the first facet;
the laser source is a self-mixing type which is configured to receive at least part of the reflected radiation guided from the second facet to the first facet and to mix the output radiation with the received radiation; and
the calculating means are for calculating the measure of the strain of the at least part of the optical fiber based on a self-mixing effect in the laser source that is caused by the linear displacement of the second section.

2. A measurement system according to claim 1, wherein the second facet is covered at least in part by a refraction index matching gel for controlling the reflected radiation in order to have a moderated mix of the output radiation with the received radiation.

3. A measurement system according to claim 1, wherein the second facet of the optical fiber is cleaved at an angle comprised between 7 and 9 degrees.

4. A measurement system according to claim 1, wherein the second facet is obtained by roughly cutting the optical fiber.

5. A measurement system according to claim 1, wherein the at least part of the optical fiber is stretched.

6. A measurement system according to claim 1, wherein the optical fiber is bended at least two times.

7. A measurement system according to claim 1, wherein the reflected radiation is comprised between 0.01% and 0.1% of the guided radiation.

8. A measurement system according to claim 1, wherein the laser source is pigtailed.

9. A measurement system according to claim 1, further including a strainable object attached to the at least part of the optical fiber.

10. A measurement system according to claim 9, wherein a strain of the object is a linear displacement parallel to the at least part of the optical fiber.

11. A measurement system according to claim 9, wherein a strain of the object is a linear displacement not parallel to the at least part of the optical fiber.

12. A measurement system according to claim 9, wherein the at least part of the optical fiber is attached to the object at a first point of the first section and at a second point of the second section.

13. A measurement system according to claim 9, wherein the at least part of the optical fiber is attached to a surface of the object or is embedded into the object.

14. A measurement system according to claim 9 wherein the object is an axle.

15. An industrial machine, comprising:
an axle; and
a laser source configured to generate an output radiation;
a strainable optical fiber having a first and a second facet, wherein the first facet is coupled to the laser source for receiving at least part of the output radiation and for transmitting therefrom a guided radiation over the optical fiber towards the second facet;
means for calculating a measure of a strain of at least part of the optical fiber, wherein:
the at least part of the optical fiber includes a first section and a second section, wherein the second section is movable by the strain of the at least part of the optical fiber according to a linear displacement of the second section with respect to the first section along the at least part of the optical fiber, the at least part of the optical fiber being attached to the axle;
the second facet is configured to receive the guided radiation and to reflect therefrom a corresponding reflected radiation towards the first facet;
the laser source is a self-mixing type which is configured to receive at least part of the reflected radiation guided from the second facet to the first facet and to mix the output radiation with the received radiation; and
the calculating means are for calculating the measure of the strain of the at least part of the optical fiber based on a self-mixing effect in the laser source that is caused by the linear displacement of the second section.

16. The industrial machine according to claim 15, wherein a strain of the axle is a linear displacement parallel to the at least part of the optical fiber.

17. The industrial machine according to claim 15, wherein a strain of the axle is a linear displacement not parallel to the at least part of the optical fiber.

18. The industrial machine according to claim 15, wherein the at least part of the optical fiber is attached to the axle at a first point of the first section and at a second point of the second section.

19. The industrial machine according to claim 15, wherein the at least part of the optical fiber is attached to a surface of the axle or is embedded into the axle.

20. A measurement method, comprising:
generating an output radiation using a self-mixing laser source;
receiving at least part of the output radiation in a first facet of a strainable optical fiber having a first section and a second section;
transmitting a guided radiation of the output radiation to a second facet of the optical fiber;
straining at least part of the optical fiber according to a linear displacement of the second section with respect to the first section along the at least part of the optical fiber;
receiving the guided radiation at the second facet and reflecting a corresponding reflected radiation towards the first facet;
receiving at least part of the reflected radiation at the laser source and mixing the output radiation with the received radiation; and
calculating a measure of the strain of the at least part of the optical fiber based on a self-mixing effect in the laser source that is caused by the linear displacement of the second section.

* * * * *